No. 686,026.  
J. CARPENTER.  
DIPPER HANDLE.  
(Application filed Aug. 16, 1901.)
Patented Nov. 5, 1901.
(No Model.)
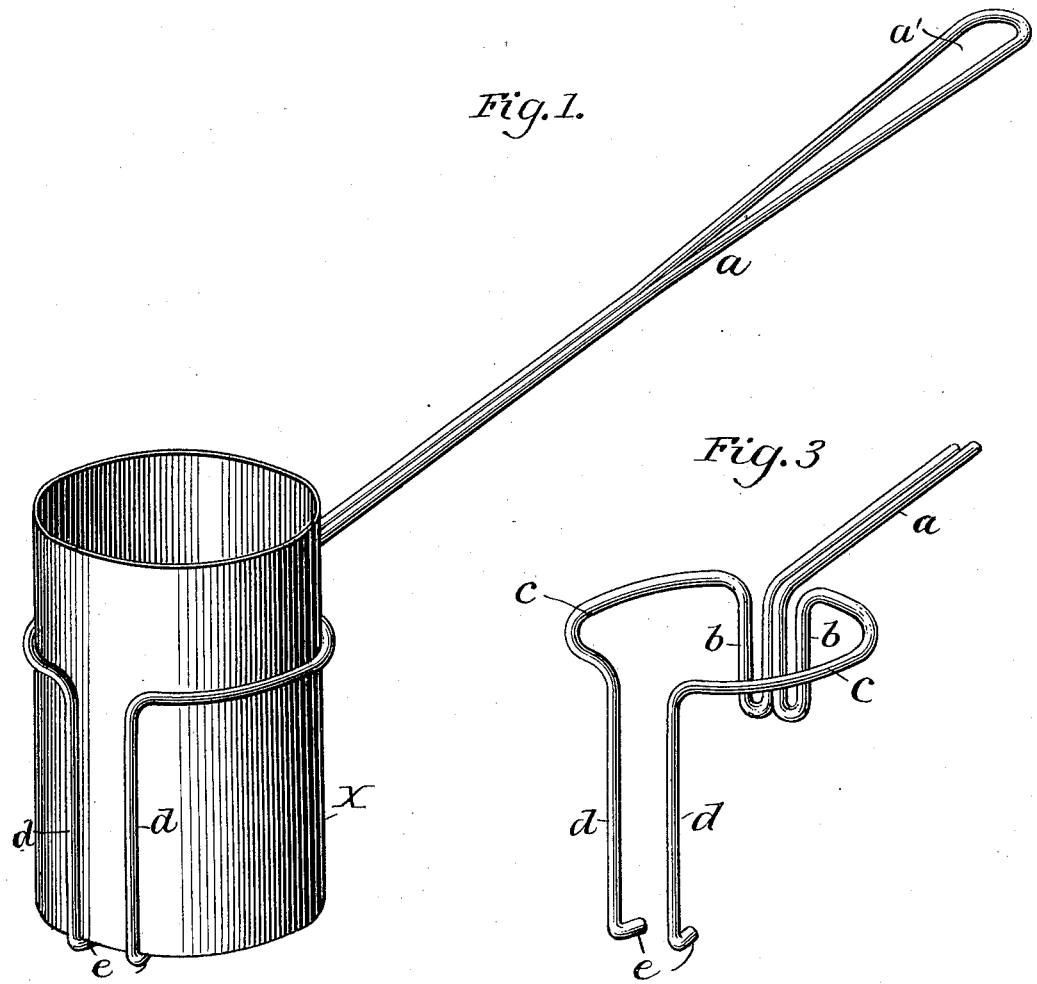
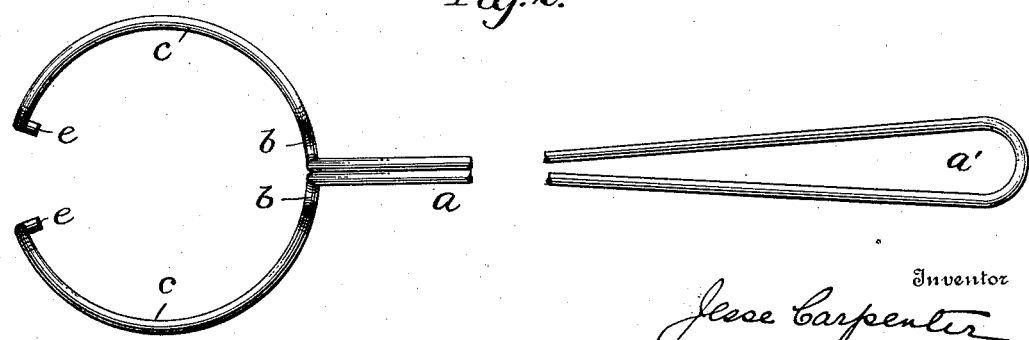
Witnesses  
J. G. Hinkel  
Thom Gillman, Jr.
Inventor  
Jesse Carpenter  
Fiske & Freeman,  
By Attorneys
THE NORRIS PETERS CO., PHOTO-LITHO., WASHINGTON, D. C.

UNITED STATES PATENT OFFICE.

JESSE CARPENTER, OF MUNCIE, INDIANA, ASSIGNOR OF ONE-HALF TO DAVID SMITH, OF ETON, INDIANA.

DIPPER-HANDLE.

SPECIFICATION forming part of Letters Patent No. 686,026, dated November 5, 1901.

Application filed August 16, 1901. Serial No. 72,251. (No model.)

*To all whom it may concern:*

Be it known that I, JESSE CARPENTER, a citizen of the United States, residing at Muncie, in the county of Delaware and State of Indiana, have invented certain new and useful Improvements in Dipper-Handles, of which the following is a specification.

This invention relates to detachable handles for dippers or similar articles, such handles being especially designed for use with cylindrical vessels, such as cans used for canning fruits, vegetables, oysters, &c.

The invention will be fully described hereinafter, reference being had to the accompanying drawings, in which—

Figure 1 is a perspective view of the handle attached to a cylindrical can. Fig. 2 is a plan view of the handle without the can, and Fig. 3 is a perspective view of the jaw end of the handle.

The handle consists of a single piece of wire, preferably spring-wire, bent upon itself to form the handle portion $a$, the downwardly-extending loops $b$ to engage the side of the can, the two horizontally-disposed curved jaws $c$ to clasp the can on opposite sides, and the two downwardly-extending legs $d$ to engage the side of the can in opposition to the loops $b$, said legs having inturned ends $e$ to fit under the bottom of the can and prevent the latter from slipping down through the jaws $c$.

The can X is indicated by dotted lines.

It will be observed that the two plies of the wire forming the handle normally lie close together along the inner portion of the handle, but are separated at the looped outer end thereof, thereby affording a better grip. The loop $a'$ at the outer end of the handle constitutes a spring and permits the jaws $c$ to be sprung apart for the easy insertion of the can between them, and such spring-loop will hold the jaws in close contact with opposite sides of the can, and this, together with the opposing pressures of the loops $b$ and legs $d$, will securely hold the can in position.

With a handle such as described empty cylindrical cans may be utilized for dippers or even for cooking vessels, and such cans, which are generally regarded as practically useless, may thus be made to serve useful purposes.

Having described my invention, I claim—

1. A detachable handle for cylindrical vessels, formed of a single piece of wire and consisting of a handle portion $a$, downwardly-extending loops $b$, opposing curved jaws $c$, and the downwardly-extending legs $d$ having inturned ends $e$, substantially as described.

2. A detachable handle for cylindrical vessels, formed of a single piece of spring-wire and consisting of a handle portion $a$ having a widened outer end and a spring-loop $a'$, downwardly-extending loops $b$, opposing, horizontally-disposed, curved jaws $c$, and the downwardly-extending legs $d$ having inturned ends $e$, substantially as described.

In testimony whereof I have signed my name to this specification in the presence of two subscribing witnesses.

JESSE CARPENTER.

Witnesses:
WILSON A. MARTIN,
ORIN M. REARICK.